(12) United States Patent
Hou et al.

(10) Patent No.: US 12,105,782 B2
(45) Date of Patent: Oct. 1, 2024

(54) SYSTEM AND METHOD TO AUTHENTICATE USERS ON A COMPUTING SYSTEM USING A FREE TEXT BEHAVIORAL BIOMETRIC METHOD

(71) Applicants: Daqing Hou, Potsdam, NY (US); Stephanie Schuckers, Potsdam, NY (US); Mahesh Banavar, Potsdam, NY (US); Blaine Ayotte, Potsdam, NY (US)

(72) Inventors: Daqing Hou, Potsdam, NY (US); Stephanie Schuckers, Potsdam, NY (US); Mahesh Banavar, Potsdam, NY (US); Blaine Ayotte, Potsdam, NY (US)

(73) Assignee: CLARKSON UNIVERSITY, Potsdam, NY (US)

( * ) Notice: Subject to any disclaimer, the term of this patent is extended or adjusted under 35 U.S.C. 154(b) by 310 days.

(21) Appl. No.: 17/591,385

(22) Filed: Feb. 2, 2022

(65) Prior Publication Data
US 2022/0245225 A1 Aug. 4, 2022

Related U.S. Application Data

(60) Provisional application No. 63/144,676, filed on Feb. 2, 2021, provisional application No. 63/144,918, filed on Feb. 2, 2021.

(51) Int. Cl.
*G06F 11/34* (2006.01)
*G06F 21/32* (2013.01)

(52) U.S. Cl.
CPC .......... *G06F 21/32* (2013.01); *G06F 11/3438* (2013.01)

(58) Field of Classification Search
CPC .................................................. G06F 11/3438
USPC .............................................................. 726/2
See application file for complete search history.

(56) References Cited

U.S. PATENT DOCUMENTS

| 8,285,658 | B1* | 10/2012 | Kellas-Dicks | ........ G06F 21/316 |
| | | | | 706/45 |
| 9,251,464 | B1* | 2/2016 | Kellas-Dicks | .......... G06F 21/55 |
| 9,686,300 | B1* | 6/2017 | Kurupati | ............. H04L 63/1425 |
| 10,075,846 | B1* | 9/2018 | Acar | .................. H04L 63/0861 |

(Continued)

OTHER PUBLICATIONS

Yu Zhong; Keystroke Dynamics for User Authentication; IEEE:2012; pp. 1-7.*

*Primary Examiner* — Monjur Rahim
(74) *Attorney, Agent, or Firm* — Bond, Schoeneck & King PLLC; George R. McGuire

(57) ABSTRACT

A system and method to authenticate users on a computing system using a free text behavioral biometric method by recording on the computer system a dataset for each user to be authenticated to create a user profile for each user to be authenticated, each data set comprising a plurality of free-text keystrokes entered by a respective user on a computer that is part of the computing system, and storing each user profile in the memory, subsequently collecting the keystrokes of a user to be authenticated as the user enters text on a keyboard connected to the computing system, creating a plurality of graphs based on the collection of keystrokes entered by the user and calculating n instance based tail area density (ITAD) metric, and then combining the ITAD metric for each graph duration into a single similarity score.

9 Claims, 21 Drawing Sheets

(56) References Cited

U.S. PATENT DOCUMENTS

| | | | |
|---|---|---|---|
| 2013/0219490 A1* | 8/2013 | Isbister | G06F 21/32 |
| | | | 726/19 |
| 2015/0294097 A1* | 10/2015 | Ramachandran | G06F 3/04883 |
| | | | 726/28 |
| 2015/0379253 A1* | 12/2015 | Cook | G06F 21/32 |
| | | | 726/19 |
| 2016/0197918 A1* | 7/2016 | Turgeman | G06F 21/316 |
| | | | 726/4 |
| 2016/0239649 A1* | 8/2016 | Zhao | H04W 12/065 |
| 2016/0294837 A1* | 10/2016 | Turgeman | G06F 21/316 |
| 2017/0061322 A1* | 3/2017 | Chari | H04L 63/1425 |
| 2020/0050744 A1* | 2/2020 | Hazan | G06N 20/00 |
| 2020/0251118 A1* | 8/2020 | Sunkavally | G10L 17/04 |
| 2020/0259638 A1* | 8/2020 | Carmignani | H04L 9/50 |
| 2020/0387587 A1* | 12/2020 | Perez-Rovira | G06F 18/24133 |
| 2021/0019385 A1* | 1/2021 | Stein | G06F 21/32 |
| 2022/0083633 A1* | 3/2022 | Hazan | G06F 21/316 |

\* cited by examiner

TABLE 1
Estimates of character counts for various types of texts

| Typed Text | Characters |
|---|---|
| Average tweet length | 60-70 |
| Average sentence | 75-100 |
| Phishing email | 120 |
| Average Facebook post | 155 |
| Gettysburg Address | 1450 |
| Nigerian prince emails | 1500-2500 |

FIG. 2 recording on the computer system a dataset for each user to be authenticated to create a user profile for each user to be authenticated, each data set comprising a plurality of free-text keystrokes entered by a respective user on a computer that is part of the computing system, and storing each user profile in the memory ← 100 collecting the keystrokes of a user to be authenticated as the user enters text on a keyboard connected to the computing system ← 200

FIG. 4A creating a plurality of graphs based on the collection of keystrokes entered by the user in step above, each of which represents a cumulative density function of the user for each feature shared between the user profile and the user to be authenticated entered in step above ← 300

↓

B

B
↓ using the computer, calculating an instance-based tail area density (ITAD) metric by ← 400

$$x_i = \begin{cases} CDF_{g_i}(x_i) & \text{if } x_i \leq M_{g_i} \\ 1 - CDF_{g_i}(x_i) & \text{if } x_i > M_{g_i} \end{cases}$$

wherein N is the number of graphs shared between the user profile and collection of keystrokes entered by the user in step (b), $CDF_{g_i}(*)$ is the empirical cumulative distribution function of the $i^{th}$ graph in the user profile, $M_{g_i}$ is the median of the $i^{th}$ graph in the user profile, $X_i$ is the individual test graph duration for the $i^{th}$ shared graph in the collection of keystrokes entered by the user in step above

↓ using the computer, combining the ITAD metric for each graph duration into a single similarity score using the following equation: ← 500

$$S = \frac{1}{N} \sum_{i=1}^{N} x_i^p$$

↓ wherein the parameter p serves as a scaling factor and can be selectively tuned depending on the application, and if 0<p<1, then lower scores are scaled up more than higher scores, and if p>1 then larger scores will be shifted down by a lesser amount than lower scores wherein the parameter p serves as a scaling factor and can be selectively tuned depending on the application, and if 0<p<1, then lower scores are scaled up more than higher scores, and if p>1 then larger scores will be shifted down by a lesser amount than lower scores

FIG. 4C

↓ determining, by the computer, whether the user entering the keystrokes in step (b) matches an authenticated user from step (a) based on the single similarity score above a predetermined threshold value ← 600

↓

Access denied ←—n o——  ——y es—→ Access granted ← 700

| Algorithm | Feature | | | | | |
|---|---|---|---|---|---|---|
| | M | DD | UD | DU | UU | Fused |
| ITAD | 0.248 | 0.197 | 0.296 | 0.202 | 0.164 | 0.123 |
| KDE | 0.220 | 0.500 | 0.500 | 0.500 | 0.500 | 0.235 |
| Manhattan | 0.290 | 0.282 | 0.329 | 0.256 | 0.243 | 0.231 |
| Scaled Manhattan | 0.244 | 0.225 | 0.301 | 0.224 | 0.211 | 0.176 |
| Mahalanobis | 0.243 | 0.278 | 0.337 | 0.268 | 0.270 | 0.223 |
| Transformed Mahalanobis | 0.252 | 0.194 | 0.277 | 0.208 | 0.161 | 0.129 |

FIG. 7

| Feature | Test Sample Size | | | | |
|---|---|---|---|---|---|
| | 10 | 20 | 50 | 100 | 200 |
| M | 0.236 | 0.241 | 0.193 | 0.157 | 0.144 |
| DD | 0.221 | 0.207 | 0.229 | 0.246 | 0.240 |
| UD | 0.129 | 0.107 | 0.088 | 0.091 | 0.095 |
| DU | 0.201 | 0.207 | 0.217 | 0.208 | 0.211 |
| UU | 0.214 | 0.238 | 0.273 | 0.299 | 0.311 |

FIG. 8

| Feature | Test Sample Size | | | | |
|---|---|---|---|---|---|
| | 10 | 20 | 50 | 100 | 200 |
| M | 0.284 | 0.269 | 0.228 | 0.174 | 0.140 |
| DD | 0.209 | 0.221 | 0.235 | 0.256 | 0.270 |
| UD | 0.125 | 0.101 | 0.085 | 0.082 | 0.085 |
| DU | 0.169 | 0.178 | 0.174 | 0.193 | 0.203 |
| UU | 0.214 | 0.232 | 0.280 | 0.295 | 0.302 |

FIG. 9

| Dataset | Test Sample Size | | | | |
|---|---|---|---|---|---|
| | 10 | 20 | 50 | 100 | 200 |
| Clarkson II | 0.221 | 0.177 | 0.123 | 0.097 | 0.078 |
| Buffalo | 0.199 | 0.136 | 0.080 | 0.053 | 0.030 |

FIG. 13

| Algorithm | FAR | FRR | ANGA | ANIA |
|---|---|---|---|---|
| 'a' Clarkson II | 0.0196 | 0.7552 | 40 | 32 |
| 'b' Clarkson II | 0.1768 | 0.1768 | 169 | 37 |
| 'c' Clarkson II | 0.7346 | 0.0085 | 3483 | 113 |
| 'a' Buffalo | 0.0338 | 0.4900 | 51 | 26 |
| 'b' Buffalo | 0.1343 | 0.1343 | 182 | 30 |
| 'c' Buffalo | 0.6500 | 0.0016 | 15250 | 71 |
| Mondal and Bours | - | - | ∞ | 304 |

FIG. 16

| Dataset | Keystrokes | M | DD | UD | DU | UU |
|---|---|---|---|---|---|---|
| Clarkson II [14] | 1.48 | 1.36 | 1.00 | 0.95 | 1.08 | 0.98 |
| Buffalo [12] | 1.22 | 1.16 | 1.00 | 0.95 | 1.06 | 1.00 |

FIG. 17

SYSTEM AND METHOD TO AUTHENTICATE USERS ON A COMPUTING SYSTEM USING A FREE TEXT BEHAVIORAL BIOMETRIC METHOD

CROSS-REFERENCE TO RELATED APPLICATION

This application claims priority to each of the following: U.S. Provisional Patent Application Ser. No. 63/144,676, filed on Feb. 2, 2021 and entitled "Benchmarking Keystroke Authentication Algorithms," the entire disclosure of which is incorporated herein by reference; U.S. Provisional Patent Application Ser. No. 63/144,722, filed on Feb. 2, 2021 and entitled "Fast Free-text Authentication via Instance-based Keystroke Dynamics," the entire disclosure of which is incorporated herein by reference; U.S. Provisional Patent Application Ser. No. 63/144,918, filed on Feb. 2, 2021 and entitled "Utilizing Keystroke Dynamics as Additional Security Measure to Protect Account Recovery Mechanism," the entire disclosure of which is incorporated herein by reference.

GOVERNMENT FUNDING

This invention was made with Government support under Grant Number CNS-1314792 awarded by the National Science Foundation. The United States Government has certain rights in the invention.

FIELD OF THE INVENTION

The present disclosure is directed generally to authentication of users of a computer system using a behavioral biometric method involving dynamic keystrokes.

BACKGROUND

In today's world, with tremendous amounts of sensitive data becoming digitized, protecting private user data is paramount. Passwords or other single-sign-on (SSO) security measures are typically the only line of defense against attackers. With the large number of accounts and passwords people are expected to remember, people tend to choose easily guessable passwords. For example, it was found in a major data breach that 60% of passwords were easily guessable. An additional form of verification to supplement SSO security schemes is needed to monitor the user of a device to ensure they are authorized.

Keystroke dynamics is a behavioral biometric that offers strong performance distinguishing users based on typing patterns. Keystroke dynamics can be used to provide an additional continuous layer of security to supplement an existing system to detect intruders in a more robust fashion. Furthermore, as most computers already have a keyboard, this layer of continuous security does not require any additional hardware.

Keystroke dynamics systems have two steps, training and testing. During the training phase, as many keystrokes as feasibly and practically possible are collected from the authorized user and used to build a profile. In many systems, features such as durations of monographs and digraphs (hold time and flight time of key-presses associated with specific letter combinations as shown in FIG. 1) are extracted from the keystrokes. The testing phase consists of keystrokes from an unknown user which are compared to an authorized user's profile to determine if the keystrokes came from the authorized user or an imposter. There are two main types of keystroke dynamics: fixed-text and free-text. Fixed-text requires the keystrokes of the test sample to exactly match with the keystrokes of the profile. The fixed text keystrokes can constitute a password or any other phrase. Most of the literature for keystroke dynamics is related to fixed-text and performance can be strong on passwords or phrases of around 10 characters. For example, Kilhourhy and Maxion achieved an EER of 9.6% for a fixed-text sample of ".tie5Roan1". Free-text, on the other hand, puts no restrictions on the keystrokes users can type. Some studies provide guidance on what users should write about, which is considered to be controlled free-text. In contrast, uncontrolled free-text puts absolutely no restrictions on what users can type, capturing user behavior while they naturally type. Continuous authentication in the uncontrolled free-text setting is difficult because users can participate in many different activities while typing. It is possible that a user's typing behavior can vary across activity or content. Additionally, getting enough similar characters in the profile and test samples can be challenging if the user is typing in different contexts. Huang et al., performed a benchmarking study where three leading algorithms were compared across four publicly available datasets and found that algorithms with the same profile and test sample sizes perform consistently worse in the uncontrolled free-text environment.

Table 1 shows the number of keystrokes for commonly typed texts. Requiring large numbers of keystrokes before these systems can detect an intruder could allow for considerable damage to be done. Existing keystroke dynamics research in the uncontrolled free-text environment have been primarily done with large keystroke samples. Many existing algorithms are distribution-based and rely on comparing distributions of digraph durations between the reference and the test user. Distribution-based algorithms require large numbers of keystrokes for both training and testing, resulting in less frequent authentication or authentication after a significant amount of typing has occurred. Currently, the existing algorithms require 500, or more keystrokes to authenticate users. For example, previous work achieved best EERs on the Clarkson II and Buffalo datasets of 3.6% and 1.95% for test sample sizes of 1,000 DD digraphs and 1,000 keystrokes respectively.

For a continuous authentication system to be useful, users should be authenticated as quickly and often as possible. This will increase overall usability and lead to the acceptability of keystroke dynamics as a behavioral biometric. To increase the speed of authentication, decisions need to be made after as few keystrokes as possible. To reduce the number of keystrokes needed for authentication, instance-based algorithms are employed, which compare graph times from the test sample individually to the reference profile. Instance-based methods are not foreign to keystroke dynamics, but are extensively used for fixed-text.

As an example, account recovery is ubiquitous across web applications but circumvents the username/password-based login step. Therefore, it deserves the same level of security as the user authentication process. A common simplistic procedure for account recovery requires that a user enters the same email used during registration, to which a password recovery link or a new username could be sent. Therefore, an impostor with access to a user's registration email and other credentials can trigger an account recovery session to take over the user's account. Accordingly, there is a need in the art for an account recovery mechanism that can validate email addresses and other credentials entered by a user Accordingly, there is a need in the art for a behavioral biometric method using free text input and with a minimal amount of input needed to authenticate a user such as in connection with account recovery.

SUMMARY

The present disclosure is directed to a system and method to authenticate users on a computing system using a free text behavioral biometric method.

According to an aspect is a computer implemented method for authenticate users on a computing system using a free text behavioral biometric method on a computer having non-transitory memory and a processor, comprising executing on the processor the steps of:

a. recording on the computer system a dataset for each user to be authenticated to create a user profile for each user to be authenticated, each data set comprising a plurality of free-text keystrokes entered by a respective user on a computer that is part of the computing system, and storing each user profile in the memory;

b. subsequently collecting the keystrokes of a user to be authenticated as the user enters text on a keyboard connected to the computing system;

c. creating a plurality of graphs based on the collection of keystrokes entered by the user in step (b), each of which represents a cumulative density function of the user for each feature shared between the user profile and the user to be authenticated entered in step (b);

d. using the computer, calculating an instance based tail area density (ITAD) metric by:

$$s_i \begin{cases} CDF_{g_i}(x_i) & \text{if } x_i \leq M_{g_i} \\ 1 - CDF_{g_i}(x_i) & \text{if } x_i > M_{g_i} \end{cases},$$

wherein N is the number of graphs shared between the user profile and collection of keystrokes entered by the user in step (b), $CDF_{g_i}(*)$ is the empirical cumulative distribution function of the $i^{th}$ graph in the user profile, $M_g$ is the median of the $i^{th}$ graph in the user profile, $X_i$ is the individual test graph duration for the ith shared graph in the collection of keystrokes entered by the user in step (b);

e. using the computer, combining the ITAD metric for each graph duration into a single similarity score using the following equation:

$$S = \frac{1}{N} \sum_{i=1}^{N} s_i^p,$$

wherein the parameter p serves as a scaling factor and can be selectively tuned depending on the application, and if 0<p<1, then lower scores are scaled up more than higher scores, and if p>1 then larger scores will be shifted down by a lesser amount than lower scores;

f. determining, by the computer, whether the user entering the keystrokes in step (b) matches an authenticated user from step (a) based on the single similarity score above a predetermined threshold value.

According to an embodiment, the shared features from step (c) can be any of a monograph and any one of a digraph DD, UD, UU, or DU.

According to an aspect is a non-transitory computer-readable medium for authenticating users on a computing system using a free text behavioral biometric method, comprising instructions stored thereon, that when executed on a processor, perform the steps of:

a. recording on the computer system a dataset for each user to be authenticated to create a user profile for each user to be authenticated, each data set comprising a plurality of free-text keystrokes entered by a respective user on a computer via a computer input device that is part of the computing system, and storing each user profile in the memory;

b. Subsequently collecting the keystrokes of a user to be authenticated as the user enters text on a computer input device connected to the computing system;

c. creating a plurality of graphs based on the collection of keystrokes entered by the user in step (b), each of which represents a cumulative density function of the user for each feature shared between the user profile and the user to be authenticated entered in step (b);

d. using the computer, calculating an instance based tail area density (ITAD) metric by:

$$s_i \begin{cases} CDF_{g_i}(x_i) & \text{if } x_i \leq M_{g_i} \\ 1 - CDF_{g_i}(x_i) & \text{if } x_i > M_{g_i} \end{cases},$$

wherein N is the number of graphs shared between the user profile and collection of keystrokes entered by the user in step (b), $CDF_{g_i}(*)$ is the empirical cumulative distribution function of the $i^{th}$ graph in the user profile, $M_g$ is the median of the $i^{th}$ graph in the user profile, $X_i$ is the individual test graph duration for the ith shared graph in the collection of keystrokes entered by the user in step (b);

e. using the computer, combining the ITAD metric for each graph duration into a single similarity score using the following equation:

$$S = \frac{1}{N} \sum_{i=1}^{N} s_i^p,$$

wherein the parameter p serves as a scaling factor and can be selectively tuned depending on the application, and if 0<p<1, then lower scores are scaled up more than higher scores, and if p>1 then larger scores will be shifted down by a lesser amount than lower scores;

f. determining, by the computer, whether the user entering the keystrokes in step (b) matches an authenticated user from step (a) based on the single similarity score above a predetermined threshold value.

According to an embodiment, the shared features from step (c) can be any of a monograph and any one of a digraph DD, UD, UU, or DU.

According to an embodiment, improved account recovery that utilizes keystroke dynamics may be used to further secure the account recovery mechanism. Using a medium fixed-text entry and scoring mechanism for a plurality of text entry fields, the present invention can achieve a 0% equal error rate (EER) using a feature-level fusion of five fields, and 0% EER for a weighted-score fusion of seven fields These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 2 is a table, labelled Table 1, that provides estimates of character counts for various types of text.

FIGS. 4A, 4B and 4C are elements of a flow chart of a process for authenticating a user of a computing system, in accordance with an embodiment.

FIG. 7 is a table showing the equal error rates (EERs) for six algorithms using the monograph and digraph features individually and fused for the Clarkson II dataset, wherein the EERs are produced when there are 50 DD digraphs in the test sample.

FIG. 8 is a table showing the relative feature importances at 10, 20, 50, 100, and 200 DD digraphs in the test sample with 10,000 DD digraphs in the profile for the Clarkson II dataset, wherein for each test sample size, the cells highlighted in blue and red denote the feature with the highest and lowest importance.

FIG. 9 is a table showing relative feature importances at 10, 20, 30, 50, 100, and 200 DD digraphs in the test sample with 10,000 DD digraphs in the profile for the Buffalo dataset, wherein for each test sample size, the cells highlighted in blue and red denote the feature with the highest and lowest importance.

FIG. 13 is a table showing EERs for varying test sample sizes (in terms of DD digraphs) for the Clarkson II and Buffalo datasets using the ITAD metric with the fused matching score. There are 10,000 DD digraphs used in the profile.

FIG. 16 is a table showing Average number of Genuine Actions (ANGA) and Average Number of Imposter Actions (ANIA), in terms of keystrokes, for points on DET curves with test sample size of 20. The points a, b, and c illustrate the tradeoff between security and convenience.

FIG. 17 is a table showing frequencies of occurrence of the features relative to the DD digraph. There will be more keystrokes and monographs than digraphs because of pauses in typing. The Buffalo dataset is closer to the ideal case as the dataset is partially controlled, whereas for the uncontrolled Clarkson II dataset there are many more keystrokes than graphs.

DETAILED DESCRIPTION OF EMBODIMENTS

Figure 1:
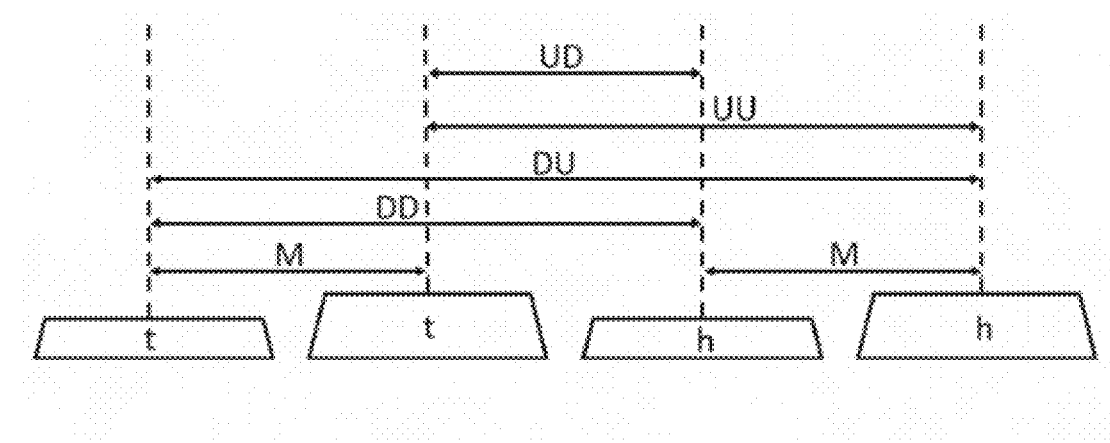
FIG. 1 is a graphical representation of how monograph and four different digraph features can be extracted from two consecutive keystrokes, with the digraphs also being referred to as press-press, press-release, release-press, and release-release.

The present disclosure describes a system and method for authenticating a user of a computing system using a free text behavioral biometric method.

An aspect of the invention is a novel instance-based metric called the instance-based tail area density (ITAD) metric. Furthermore, the importance of monographs and digraphs, commonly used features in keystroke dynamics, is determined for user authentication. The features are fused at the score level into a single fused matching score using the feature importances determined from a random forest classifier. The effectiveness of the fused matching score is demonstrated on two publicly available datasets, the Clarkson II and Buffalo datasets. Authentication with as few keystrokes as possible allows imposters to be detected faster and thus better protects sensitive user data.

For context it is beneficial to understand the features commonly used in keystroke dynamics research.

Timing information recorded from keystrokes can be considered a time series. In its raw form, it is non-stationary because the time interval between keystrokes can occur at any interval and is not sampled at a continuous rate. Working with non-stationary time series data can be very challenging and one of the common approaches to extract stationary data is differencing. The concept of differencing in keystroke dynamics may sound foreign, but in fact goes as far back as the 1980s when researchers used digraphs defined as the time taken to type two consecutive characters. For their study, the authors only had access to the time a key was pressed down, so they believed digraphs to be the lowest level feature in their experiment. A survey of 187 papers, found that 49% used digraphs, 41% used monographs, 5% used pressure, and 5% used other features (pressure is not considered in this paper as it requires special hardware to collect the data). Additionally, Teh et al. point out that research investigating and comparing common features used for keystroke dynamics is missing. This could be very beneficial to the keystroke dynamics field by providing insight to which features are most explanative of user behavior.

The features commonly used today are the result of differencing. Monographs are defined as the time between when a key is pressed down to when it is released. Digraphs, or flight times, are usually defined in literature to be the time between two connective key-presses. In this work, four different definitions of digraphs are used, referred to as DD, UD, DU, and UU. D corresponds to a key-down event and U corresponds to a key-up event. The four digraph features are the time from the first key either being pressed (D) or released (U) to the time the second key is pressed or released. The monograph feature and the four digraph features can be seen in FIG. 1. Similar to work done in [8], the graphs are only considered if their durations fall in a specific range to eliminate digraph durations that span pauses or typing sessions.

Although trigraphs and other n-graphs have shown to be highly representative of users, no trigraph features or n-graph features are used in this work due to the focus on fast authentication. Using only the English alphabet, there are 26 distinct monographs, 26×26=676 distinct digraphs, and 26×26×26=17,576 distinct trigraphs. The numbers are much larger when including punctuation, numbers, and other function keys. While of course not all digraphs, trigraphs, or n-graphs have the same probability of occurrence, it is clear to see that with minimal keystrokes in the test sample, the probability of getting trigraphs or larger n-graphs that match a given profile is low.

For further understanding and appreciating aspects of the invention, the datasets used in researching and developing the invention is beneficial.

Two publicly available datasets, the Clarkson II uncontrolled free-text dataset [14] and the Buffalo partially controlled free-text dataset, are used to validate results. The Buffalo free-text dataset consists of a total of 148 participants who contributed a combined 2.14 million keystrokes. The Buffalo dataset is split into two categories: baseline and rotation. The baseline set has 75 users where the same keyboard is used. The rotation set has 73 users and three different keyboards are used. Within both rotation and baseline, there were three identical sessions consisting of transcribing Steve Jobs commencement speech at Stanford University, free-text response to survey questions, and an image, as well as some tasks designed to mimic daily work such as responding to emails and freely surfing the internet. We consider the Buffalo dataset partially controlled free-text because it is a combination of free-text and transcribing tasks. The rotation enables researchers to study the effects of different keyboards on typing behavior.

The Clarkson II dataset was collected at Clarkson University. Containing over 12.9 million keystrokes across 103 users, to the best of applicant's knowledge, it is the largest free-text dataset available where an average user has 125,000 keystrokes. This dataset is different from the other publicly available datasets as all keystrokes are recorded as users interact normally with their computers. A keylogger ran in the background of participants computers, passively recording all of their keystrokes regardless of application or context. Users had the option of temporarily disabling the keylogger to protect their private information.

The performance of algorithms on the Clarkson II dataset compared to other more controlled free-text datasets is always worse. The Buffalo dataset is partially controlled, due to containing free-text and transcribing tasks, whereas the Clarkson II dataset is completely uncontrolled. As a result, it is expected that the performance of all algorithms to be better on the Buffalo dataset.

Figure 3:
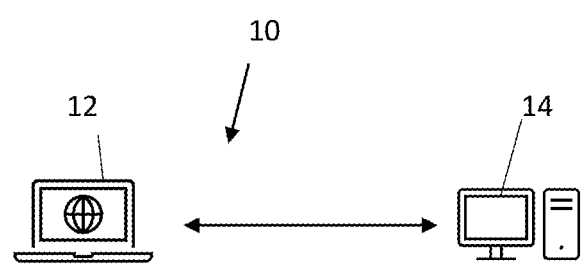
FIG. 3 is a schematic of a computing system in accordance with an embodiment.

In previous works, digraphs and keystrokes are both common methods of measuring the amount of data in the profile and test sample. For example, a test sample size of 50 DD digraphs contains 50 DD digraphs and all other graph features that occurred while typing those DD digraphs, and a test sample size of 50 keystrokes contains all graph features that occur within those 50 keystrokes. To best compare our results to literature, we provide a table of feature occurrence for the monograph and four digraph features for both datasets in FIG. 3. FIG. 3 can be used to freely convert keystrokes to DD digraphs and vice versa. Results will be presented in terms of DD digraphs with the exception of presenting results in terms of average number of genuine actions (ANGA) and average number of imposter actions (ANIA) where keystrokes are used.

Referring to FIG. 1, in one embodiment, is a schematic of a computing system 10, comprising a computer 12 and a computer 14 networked together in a conventional manner (e.g., ethernet, wireless or wired or satellite internet, etc.). Contextually and for simplicity, a user of computer 12 needs to be authenticated to gain access to certain data stored in non-transitory memory on either of computer 12 or 14 or to simply gain access to certain applications residing on these computers. Either or both of computers 12 and 14 include non-transitory memory and a processor.

When a user is trying to gain access to computer system 10, he/she must first be authenticated. In one aspect, a system and method for authenticating the user using a free text behavioral biometric process is described.

With reference to FIGS. 4A-4C, the basic process is laid out. First a dataset of free-text tnered keystrokes is collected for each user to be authenticated using a keylogger and a user profile is created by the computer in step 100 (note the keylogger can be turned off by the user in order to protect any personally sensitive information). Next, once a user is using computing system 10 and desires access, he or she will begin typing on the keyboard and the keystrokes will be collected using a keylogger in step 200. The processor of the computer will then create a plurality of graphs based on the collection of keystrokes, each of which represents a cumulative density function of the user for each feature shared between the user profile and the user to be authenticated in step 300. Next, an instance based tail area density metric is calculated in the manner described below in step 400. Next, in step 500, using the computer, the ITAD metric for each graph duration is combined into a single similarity score using the following equation:

$$S = \frac{1}{N}\sum_{i=1}^{N} s_i^p.$$

Next, in step 600, determining, by the computer, whether the user entering the keystrokes matches an authenticated user from step based on the single similarity score above a predetermined threshold value. And, finally, if the similarity score is above a predetermined threshold, access is granted and if it does not, then access is denied, in step 700.

With regard to the instance-based distance metric referred to as the instance-based tail area density (ITAD) metric, it works as follows. The ITAD metric makes no assumptions about distributions and solely relies on the tail area under the PDF, or the percentile value of the sample. The ITAD metric is calculated as follows:

$$s_i \begin{cases} CDF_{g_i}(x_i) & \text{if } x_i \le M_{g_i} \\ 1 - CDF_{g_i}(x_i) & \text{if } x_i > M_{g_i} \end{cases},$$

where N is the number of graphs shared between the test sample and the profile, CDFgi(·) is the empirical cumulative distribution function of the ith graph in the profile, Mgi is the median of the ith graph in the profile, and xi is the individual test graph duration for the ith shared graph in the test sample. The ITAD metric is always between 0 and 0.5, and because it is a similarity score, the larger the s value, the closer the sample is to the profile. The ITAD metric for N singular graph durations is combined into a single similarity score S as:

$$S = \frac{1}{N}\sum_{i=1}^{N} s_i^p.$$

The parameter p serves as a scaling factor and can be tuned depending on the application. If 0<p<1 then lower scores are scaled up more than higher scores and if p>1 then larger scores will be shifted down by a lesser amount than lower scores.

Figure 5:
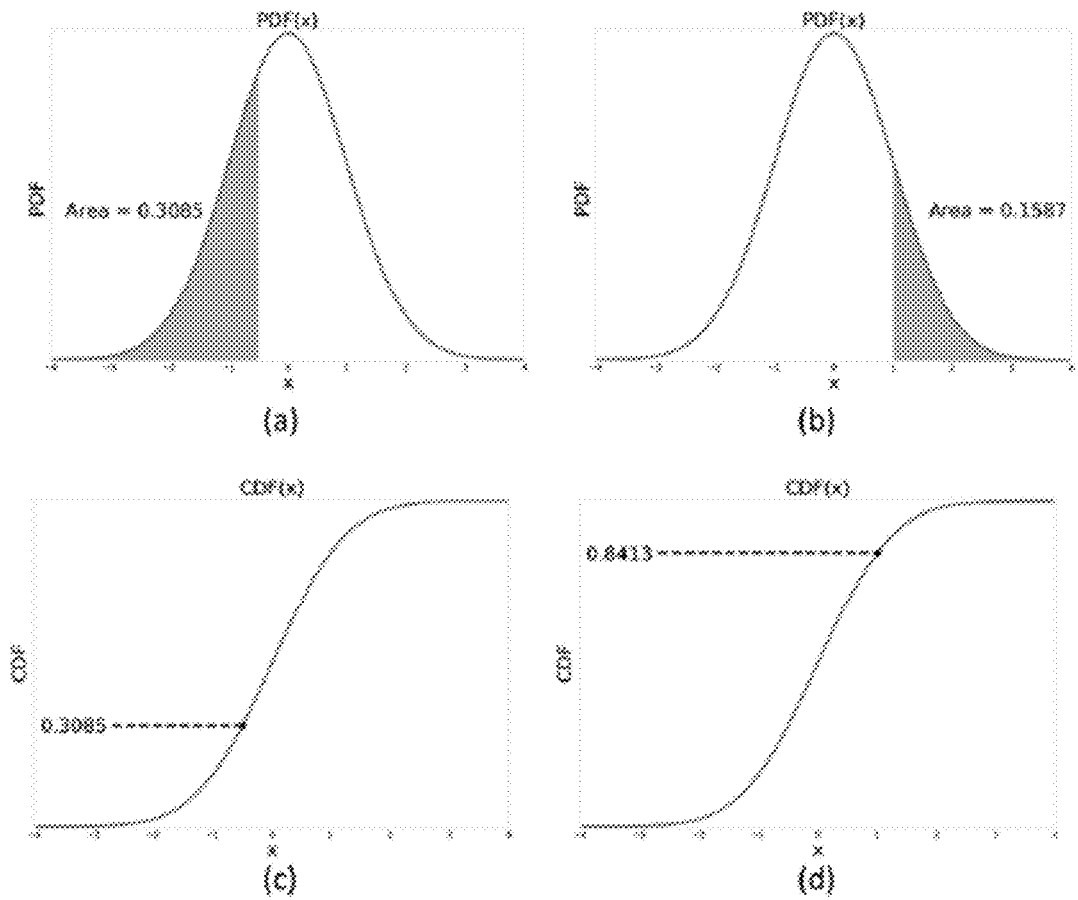
FIG. 5 is a graphical representation of how the ITAD metric is computed from the PDF (a) and (b) or CDF (c) and (d), in accordance with an embodiment.

FIG. 5 shows a graphical representation of how the ITAD metric is computed. In terms of the PDF, the ITAD metric is computed as the tail area of the PDF. When the sample is below the median value, the ITAD metric takes the tail area on the left and when the sample is above the median, the ITAD metric takes the tail area on the right.

Figures 6A, 6B:
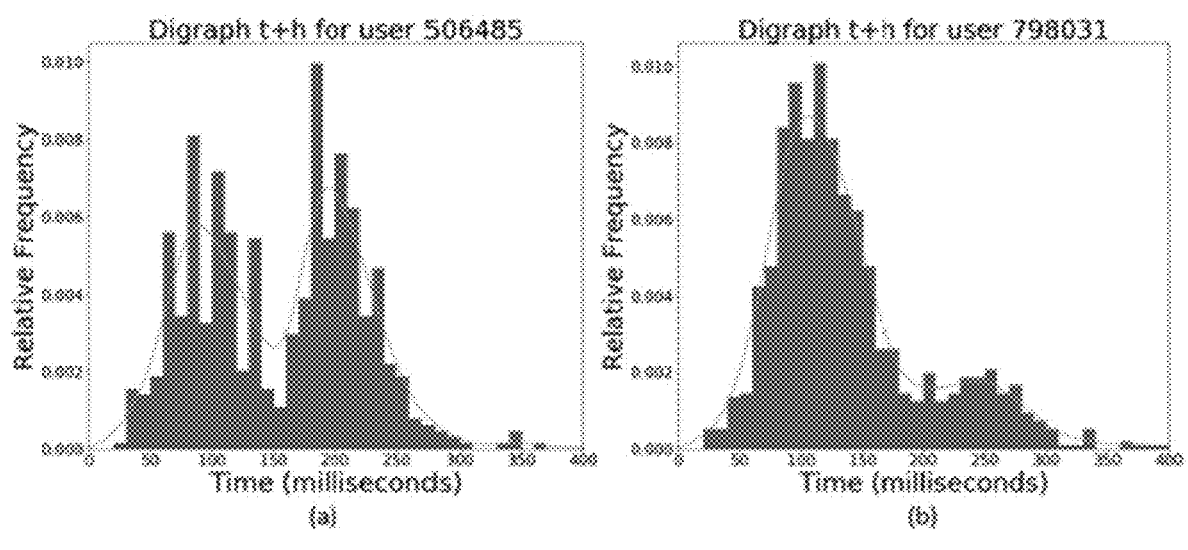
FIGS. 6(a) and 6(b) are two digrap PDF's exhibiting clear non-Gaussian behavior from the Clarkson II dataset, wherein the y-axis is relative frequency of occurrence and the x-axis is the time in milliseconds on the "t+h" graph, in accordance with an embodiment.

Many of the previous works using instance-based algorithms have used Euclidean distance, Mahalanobis distance, or probability scores all of which were based on a mean and variance from user profiles. These methods rely on the data having a meaningful mean and variance, which is not necessarily the case for non-Gaussian data. FIG. 6 shows the PDFs of "t+h" digraphs for two users which are clearly not Gaussian, suggesting a Gaussian approximation may not be the best assumption. For example, the sample mean of the data in FIG. 6(*a*) will be directly in between the two peaks of the data. For this distribution, the distance from the mean will always be high, not because test samples are anomalous, but rather because the model does not fit the data well. The ITAD metric takes the percentile value, which causes it to be more resistant to outliers than the sample mean.

However, the main power of the ITAD metric is from its non-parametric estimation of underlying distributions, which, as illustrated in FIG. 5, are often not Gaussian. As a result, similarity or distance metrics such as Mahalanobis and Manhattan distance, which assume a Gaussian distribution, perform worse than the newly proposed ITAD metric. The Mahalanobis and Manhattan distances work well when each distribution is Gaussian because they provide a framework of normalizing each distribution to zero mean and unit variance, allowing for straightforward combination of multiple samples from different distributions. The ITAD metric can be thought of as providing a similar framework, but for when the distributions are not all of one type (i.e. Gaussian). The ITAD metric determines the average similarity between multiple nonparametric distributions (determined empirically from a set of previous observations) and a new observation. FIG. 7 shows a table having the EERs for various algorithms run on the Clarkson II dataset, and it can be seen that the lowest EERs for each feature individually, and fused, is by the ITAD metric, and the performance of the algorithms improve with the fused matching score.

The matter of feature importance is determined using a random forest classifier from both the Clarkson II uncontrolled free-text dataset and the partially controlled Buffalo dataset. The feature importance is taken as the mean decrease in impurity (MDI) from the random forest classifier. MDI is defined as the total decrease in node impurity (weighted by the probability of reaching that node) averaged over all the trees in the ensemble [34]. The probability of reaching the node is approximated by the proportion of samples reaching that node. The scikit-learn implementation of random forests and MDI are used in this paper.

The feature importances are calculated for the monograph and four digraph features with 10,000 DD digraphs in the profile and using different numbers of DD digraphs in the test sample: 10, 20, 50, 100, and 200. A one versus all random forest classifier is built for each user. The inputs to the random forest are the scores from the ITAD metric for each feature. To ensure the importances are representative of the data, they are calculated for each user 50 times with different subsets of user data and then averaged together. The average feature importances are reported in the tables from FIGS. 8 and 9 for the Clarkson II and Buffalo datasets.

The least important feature for both datasets and all test sample sizes is the UD digraph. The most important feature for both datasets is between the monograph and UU digraph. For smaller test sample sizes the monograph feature becomes more important and for larger test sample sizes the UU digraph is more important.

While the feature importances are only shown for the ITAD metric, the overall trends are the same for every algorithm. The only exception is for KDE which finds monographs far more important at smaller test sample sizes (as seen in Section 6). This is because with small test samples sizes it is far more likely to see four of the same monograph than four of the same digraph (KDE is distribution-based and needs four or more occurrences in both the profile and test set to compute a distance score).

While some features are more important than others, they all contribute to the overall classification. All five features are fused at the score level to combine the individual graph features into a single matching score. A weighted average of the graph scores is taken using the feature importances calculated from the MDI as the weights. This allows the five graph scores to be combined into a single fused matching score. Thresholding is performed on this single matching score to produce DET curves and EERs. This process was used to compare the six algorithms.

Figure 10:
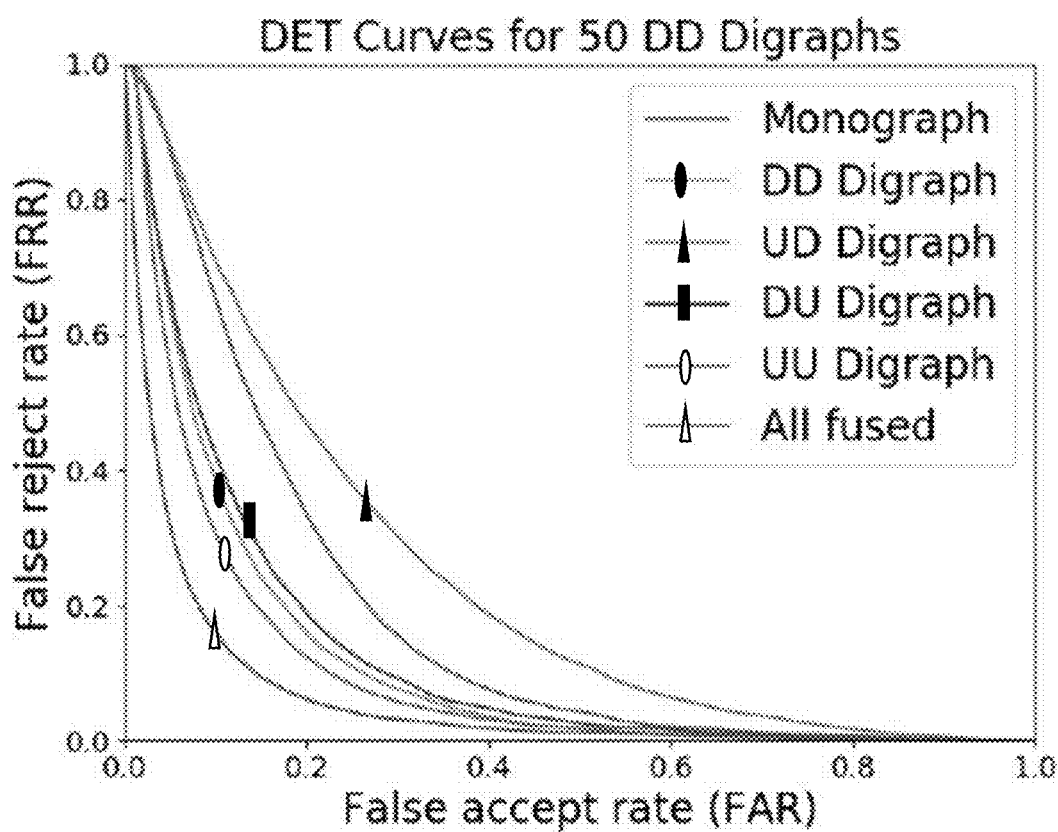
FIG. 10 is a graph showing DET curves for the Clarkson II dataset for the five graph features as well as the fused case for a profile size of 10,000 DD digraphs and test sample size of 50 DD digraphs. The best performing feature is the UU digraph and the worst performing feature is the UD digraph, consistent with the feature importance. A clear improvement can be seen from fusing the five features.

FIG. 10 shows the performance of the features individually and fused using the ITAD metric for the Clarkson II dataset. The trends across the Clarkson II and Buffalo datasets are identical and therefore only the results for Clarkson II are shown. The feature importances are consistent with the DET curves. Features with higher importance have lower EERs and features with lower importance have higher EERs. It can also be clearly seen that fusing the five features together yields the best overall performance. While the EERs are shown only for the ITAD metric, just as with the feature importances, the overall trends are still the same for every algorithm. Again, the KDE algorithm is different because monographs contribute to the overall decision far more at smaller test sample sizes.

The performance of the ITAD metric is evaluated with different test sample sizes, profile sizes, as well as in terms of the average number of genuine actions (ANGA) and the average number of imposter actions (ANIA). The evaluations are done in terms of DD digraphs (except for ANGA and ANIA which are presented in terms of keystrokes). In the three following subsections, the ITAD metric is used with the fusion of the five graph features to obtain results. p=½ is used for combining the individual similarity scores into a single similarity score. DET curves, EERs, ANGA, and ANIA are used to present results.

Figure 11:
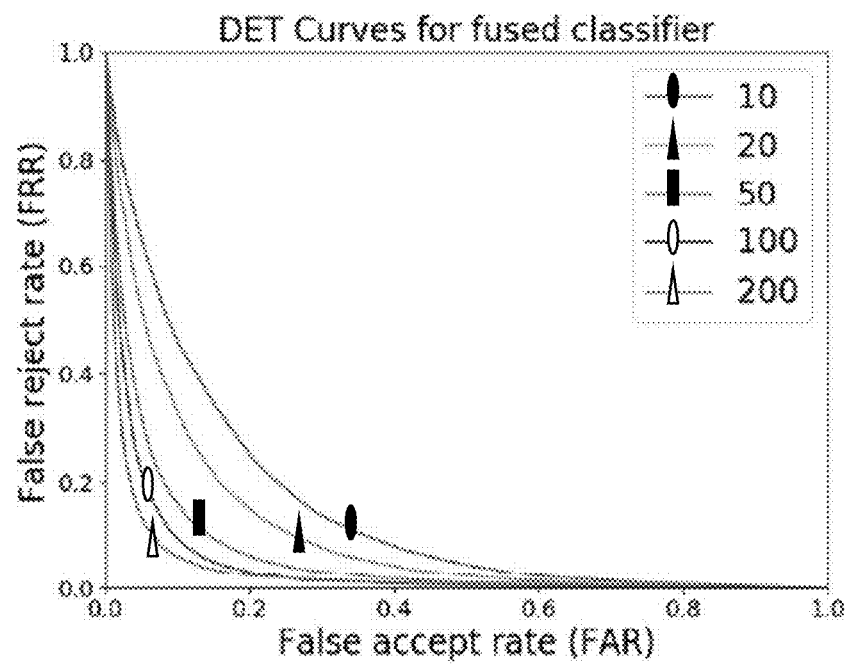
FIG. 11 is a graph showing DET curves for the Clarkson II dataset with the fused matching score and ITAD metric. The profile size is 10,000 DD digraphs and the test sample size ranges from 10 to 200 DD digraphs. As the test sample size increases the performance improves, but with diminishing returns.
Figure 12:
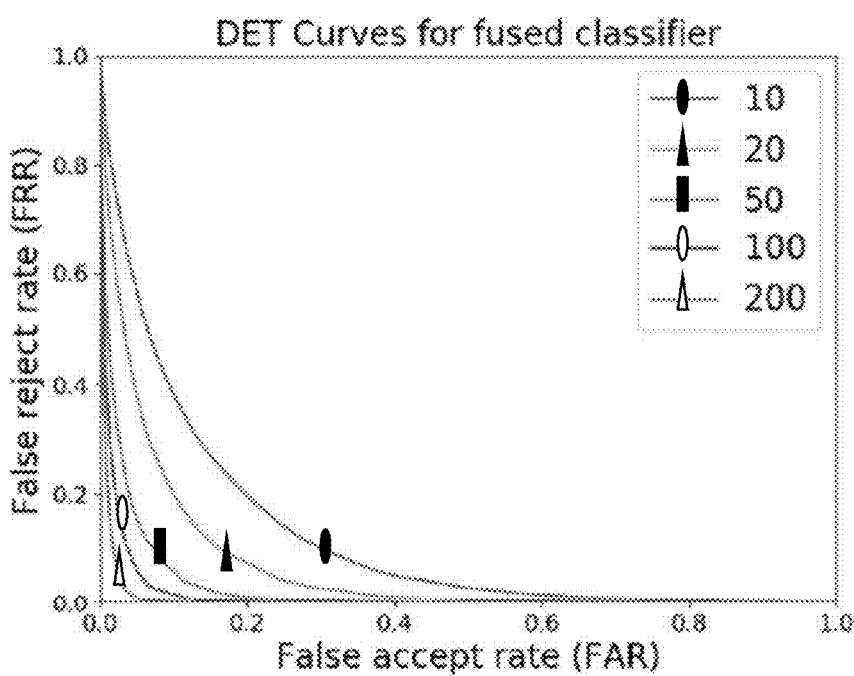
FIG. 12 is a graph showing DET curves for the Buffalo dataset with the fused matching score and ITAD metric. The profile size is 10,000 DD digraphs and the test sample size is varied from 10 to 200 DD digraphs. As the test sample size increases the performance improves, but with diminishing returns.

The performance of ITAD is heavily dependent on the number of DD digraphs (or keystrokes) present in the test sample. With large numbers of DD digraphs in the test sample, accuracy will be better, and with fewer DD digraphs, the accuracy will be worse. Fast authentication (fewer DD digraphs) is preferable as intruders should be detected as soon as possible to mitigate risk. FIGS. 11 and 12 show the DET curves for varying test sample sizes for both the Clarkson II and Buffalo datasets. The curves are produced with 10,000 DD digraphs in the user profiles. Monte Carlo cross validation is performed and the experiment is repeated 50 times using different subsets of user data.

As can be seen for both the Clarkson II and Buffalo datasets, the more DD digraphs in the test sample the better the performance. This is consistent with previous works using distribution based algorithms. In general, the performance on the Buffalo dataset is better than the Clarkson II dataset due to the uncontrolled nature of the Clarkson II dataset. The EERs for all test sample sizes and both datasets are summarized in the table of FIG. 13. The lowest EERs for the Clarkson II and Buffalo datasets are 7.8% and 3.0% with 200 DD digraphs in the test sample.

The performance of the ITAD algorithm is evaluated depending on the amount of DD digraphs in the profile. Building a user profile is a necessary part of keystroke dynamics authentication. While it is important imposters are detected after as few DD digraphs (or keystrokes) as possible, convenient use of the system is important as well. Users need to be able to enroll quickly (with fewer DD digraphs) or they may lose interest and decide the biometric recognition system is not worth using. One accepted average number of characters per minute is 187. This means it would take approximately one hour of continuous typing to collect 10,000 DD digraphs.

Figure 14:
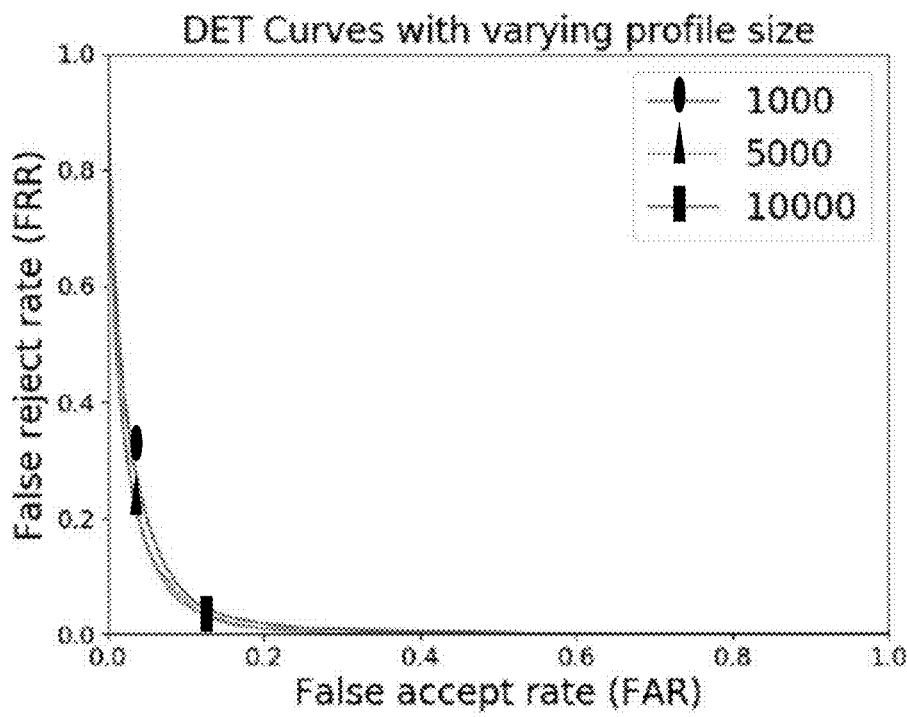
FIG. 14 is a graph of DET curves for the Clarkson II dataset using the fused matching score and the ITAD metric. The profile size is varied from 1,000 to 30,000 DD digraphs with 50 DD digraphs in the test sample. As the profile size increases the performance improves, but with diminishing returns.
Figure 15:
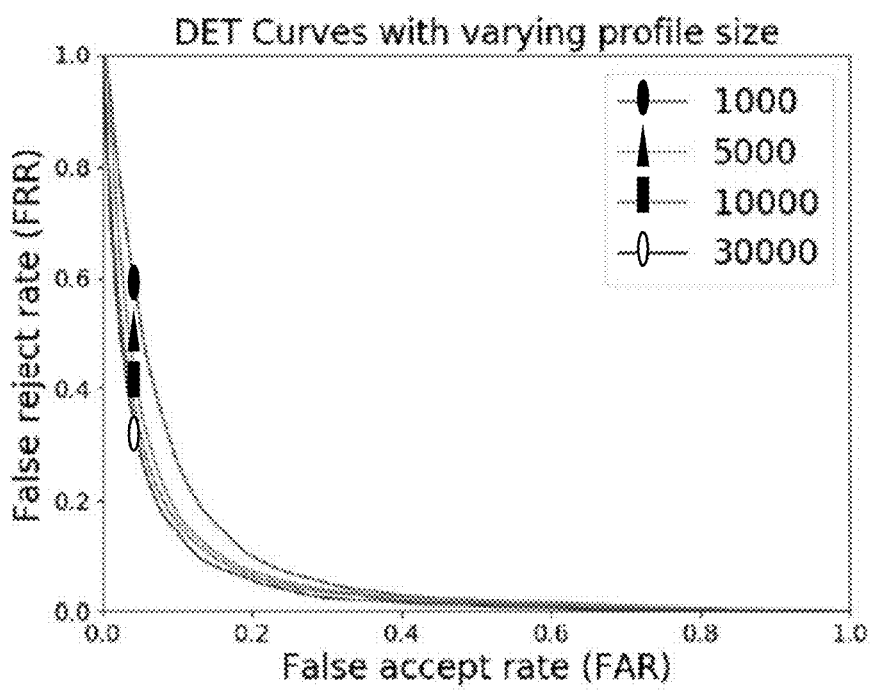
FIG. 15 is a graph of DET curves for the Buffalo dataset using the fused matching score and the ITAD metric. The profile size is varied from 1,000 to 10,000 DD digraphs with 50 DD digraphs in the test sample. As the profile size increases the performance improves, but with diminishing returns.

FIGS. 14 and 15 show the DET curves for varying profile sizes for both the Clarkson II and Buffalo datasets. As the profile size increases the performance improves, but suffers from diminishing returns. It was found that the performance improved as the profile size increased (only when profile and test sizes were both larger otherwise performance decreased). It is determined there is no decrease in performance, but instead, performance plateaus. This is promising as an adequate user profile may be constructed with as few as 1,000 DD digraphs, allowing for fast enrollment.

Another way of presenting keystroke dynamics system performance is through the average number of genuine actions (ANGA) before an authorized user is rejected and the average number of imposter actions (ANIA) before an imposter is locked out. The ANGA and ANIA are directly related to the block size, FAR, and FRR as ANGA=block size/FRR and ANIA=block size/(1−FAR).

To compare performance in terms of ANGA and ANIA, three points along the DET curve of test sample size of 20 are selected. Point 'a' favors security, point 'b' weights convenience and security equally (the equal error rate), and point 'c' favors convenience. The FAR, FRR, ANGA, and ANIA for the aforementioned points are shown in the table of FIG. 16 in terms of keystrokes (converted from DD digraphs using the table of FIG. 17).

One application comprises the use of keystroke dynamics as an additional security measure to further protect the account recovery mechanism. More specifically, the present invention involves the application of a scaled Manhattan distance scoring algorithm to keystroke dynamics collected when an account recovery dataset having multiple fields is typed in by a user seeking to recover an account and compared to a previously recorded set of keystroke dynamics collected when the fields were previously typed in by the user and stored in a user profile.

Figure 18:
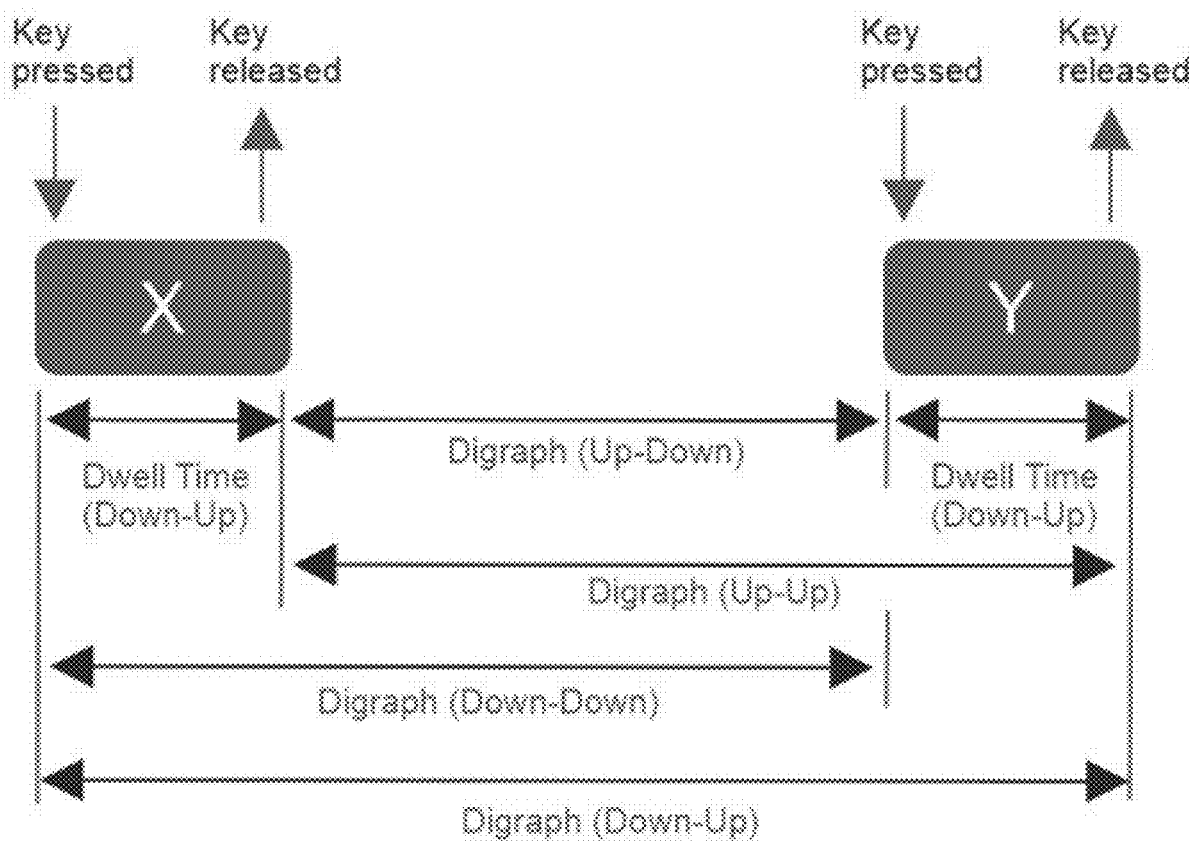
FIG. 18 is a schematic of keystroke dynamics features used by an application of the present invention.

Referring to FIG. 18, the keystroke dynamic features used in connection with the present invention comprise dwell times and digraph times associated with the typing of text into the fields by the user. The keystroke dynamic features are extracted by using the timing information of keys pressed, which includes latency between keys and dwell/hold time of a single key. As seen in FIG. 18, the latency between keys may include the time interval between the press of a key and the press of the next key (down-down), the interval between the release of a key and the press of the next key (up-down) or interval between the release of a key and the release of the next key (up-up). The dwell/hold time is the interval between the press and the release of a single key (down-up).

Figure 19:
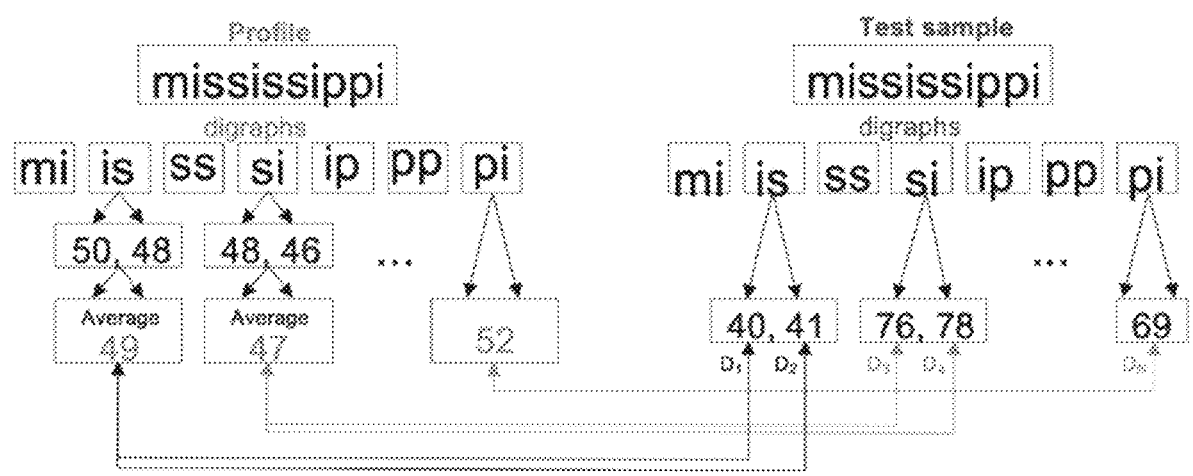
FIG. 19 is an example of the scoring procedure for sample text entry in a field.

Referring to FIG. 19. the scoring algorithm works by evaluating text entry by the user, illustrated in FIG. 19 as the word 'mississippi.' In the sample text, there are two instances for each of digraph 'is', 'ss' and 'si' and one instance for the other four, making a total of seven unique digraphs and ten digraph instances. For each digraph instance in the test sample, the scoring algorithm computed the difference between its timing and the mean timing of the same digraph in the profile. The overall score is the sum of all individual scores, which measure how dissimilar the test sample is to the user profile. The higher the distance score, the less likely the test sample keystrokes belong to the user. In the implementation of the present invention, all keystrokes that have a digraph of more than ½ a second were discarded as such digraphs are less likely to be informative; the resulting time information would be an outlier and negatively affect performance.

The preferred algorithm for scoring according to the present invention is the scaled Manhattan distance metric. The scaled Manhattan distance is calculated as follows:

$$D = \sum_{i=1}^{N} \frac{|\mu_{g_i} - x_i|}{\sigma_{g_i}},$$

where N is the number of digraphs shared between the test sample and the profile, $x_i$ is the individual test graph duration for the $i^{th}$ shared graph in the test sample, and $\mu_{g_i}$ and $\sigma_{g_i}$ are the mean and standard deviation of the $i^{th}$ graph in the profile. Scaled Manhattan Distance outperforms the other four algorithms on the Declare field. Table 1 below shows further evidence that this is also true for most of the remaining six fields.

TABLE 1

Performance of Scaled Manhattan Distance relative to other algorithms

| Field | Euclidean Distance EER (%) | Manhattan Distance EER (%) | Scaled Manhattan Distance EER (%) | Mahalanobis Distance EER (%) | Gunetti & Picardi Distance EER (%) |
|---|---|---|---|---|---|
| Zip | 25.33 | 25.20 | 22.80 | 21.84 | 28.69 |
| City | 19.51 | 19.52 | 20.36 | 20.85 | 26.88 |
| Phone | 22.41 | 18.25 | 18.02 | 22.50 | 39.59 |
| Full name | 17.29 | 16.31 | 14.16 | 16.04 | 20.67 |
| Address | 15.41 | 13.63 | 10.81 | 10.96 | 18.17 |
| Email | 12.59 | 9.62 | 8.10 | 12.45 | 15.75 |
| Declare | 15.73 | 15.74 | 5.47 | 9.88 | 17.07 |

This present invention may further evaluate the fusion of fields at the feature level to identify a combination of fields that gives the highest accuracy (the lowest EER). Specifically, all the keystrokes from multiple fields were merged and then the Scaled Manhattan Distance scoring algorithm was applied. Six major combinations were evaluated, which are referred to as Duet (combination of two fields), Trio (combination of three fields), Quartet (combination of four fields), Quintet (combination of five fields), Sextet (combination of six fields) and Septet (combination of seven fields).

The present invention was further evaluated by weighted score fusion, where the final score D is defined as a weighted sum of individual field scores di (D=w1×d1+w2×d2+ . . . +wN×dN), and all weights sum up to one (w1+w2+ . . . +wN=1). A grid-search approach was used to find the optimum weights for each combination.

In keystroke dynamics, enough enrollment samples are required to build the user's profile. The more the enrollment samples are included in a user's profile, the more accurate the algorithm will perform. Although there is not a definite number of enrollment samples required to build a good profile, performance was monitored as the number of enrollment samples was reduced. During data collection, users completed the enrollment process ten times and all ten enrollment samples were used to build their profile. The number of enrollment samples was also from 10 to 5 using both feature-level and weighted score fusion techniques.

Table 2 below shows the performance of the Scaled Manhattan Distance over the seven fields on an exemplary account recovery web form. 'Declare', 'Email', and 'Address' are the three best performing fields with EER of 5.47%, 8.1%, and 10.81%, and an average of 51, 20, and 16 digraphs, respectively. The 'Zip' field has the lowest accuracy with EER of 22.8%, with a very short average of only 4 digraphs.

TABLE 2

Authentication based on individual fields

| Field | #Avg shared digraph | K | #Comparison | EER (%) |
|---|---|---|---|---|
| Zip | 4 | 90% | 175 | 22.80 |
| City | 7 | 70% | 343 | 20.36 |
| Phone | 8 | 70% | 191 | 18.02 |
| Fullname | 12 | 70% | 311 | 14.16 |
| Address | 16 | 70% | 277 | 10.81 |
| Email | 20 | 70% | 333 | 8.10 |
| Declare | 51 | 70% | 304 | 5.47 |

As evident from above, field lengths seem to greatly influence performance and likely to be the main reason why the 'Declare' field has the best performance. On the other hand, familiarity with text may also have a relatively strong influence on performance. This is because more familiar content, such as email, are more likely to reveal a user's typing pattern.

Out of the seven fields in the sample account recovery form, there are 21 combinations for Duet (two fields), 35 combinations for Trio (three fields), 35 combinations for Quartet (four fields), 21 combinations for Quintet (five fields), 7 combinations of Sextet (six fields) and 1 for Septet (seven fields). Table 3 below depicts the best performance for each of the above field combinations.

TABLE 3

Feature level fusion of multiple fields

| Field | #Shared digraph | K | #Comparison | EER (%) |
|---|---|---|---|---|
| DUET | | | | |
| Email + Fullname | 29 | 90% | 165 | 4.88 |
| TRIO | | | | |
| Declare + Email + Address | 78 | 70% | 254 | 3.13 |
| QUARTET | | | | |
| Declare + Email + Address + Fullname | 82 | 70% | 224 | 2.36 |
| QUINTET | | | | |
| Declare + Email + Address + Fullname + City | 90 | 90% | 52 | 0.00 |

TABLE 3-continued

Feature level fusion of multiple fields

| Field | #Shared digraph | K | #Comparison | EER (%) |
|---|---|---|---|---|
| SEXTET | | | | |
| Declare + Email + Address + Fullname + City + Zip | 95 | 90% | 48 | 0.00 |
| SEPTET | | | | |
| Declare + Email + Address + Fullname + City + Zip + Phone | 102 | 70% | 227 | 2.18 |

Consistent with the observed impact of the length of text on accuracy, an overall trend in the table is that as the number of shared digraph increases, EER decreases. The present invention achieved 0% EER at the combination of five fields (Quintet) with an average of 90 shared digraphs and a K of 90%. Therefore, it is not necessary to fuse all seven fields to achieve perfect accuracy. Furthermore, the best field combinations in Table [6] above, from Trio down to Sextet, are mostly made of the set of best individual fields from Table [5] above. For example, the best combination of fields in Quartet is Declare+Email+Address+Fullname, which are the four best fields. However, a performance drop occurs at Septet (a combination of seven fields) despite an increase in the average shared digraph.

As seen in Table 4, the global best result for weighted-score fusion is achieved at the combination of seven fields with EER of 0% and 83 comparisons.

TABLE 4

Weighted-score fusion of multiple fields

| Field | #Comparison | K | EER (%) |
|---|---|---|---|
| PAIR | | | |
| Email(w = 0.75) + Declare(w = 0.25) | 293 | 70% | 4.3 |
| TRIO | | | |
| Email(w = 0.55) + Declare(w = 0.25) + Fullname(w = 0.2) | 257 | 70% | 2.7 |
| QUARTET | | | |
| Email(w = 0.45) + Declare(w = 0.25) + Fullname(w = 0.15) + Address(w = 0.15) | 231 | 70% | 2.27 |
| QUINTET | | | |
| Email(w = 0.45) + Declare(w = 0.25) + Fullname(w = 0.1) + Address(w = 0.15) + Zip(w = 0.05) | 201 | 70% | 2.21 |
| SEXTET | | | |
| Email(w = 0.4) + Declare(w = 0.25) + Fullname(w = 0.1) + Address(w = 0.1) + Zip(w = 0.1) + Phone(w = 0.05) | 141 | 70% | 1.4 |
| SEPT | | | |
| Email(w = 0.35) + Declare(w = 0.25) + Fullname(w = 0.15) + Address(w = 0.05) + Zip(w = 0.05) + Phone(w = 0.05) + City(w = 0.01) | 83 | 80% | 0.00 |

Consistent with the observed positive impact of the length of text on accuracy, an overall trend is that as the number of shared digraph increases, EER decreases. Furthermore, compared with the feature-level fusion, the weighted-score fusion performs better for Duet, Trio and Quartet, with lower EERs and higher number of comparisons. The weighted score-level fusion may thus be a better choice because it uses more data (number of comparisons) and produces better performances when a less restrictive content matching is applied (K is 70%; K is 80% for the combination of seven fields (Septet)). These results outperform the state-of-the-art in both fixed-text and free-text keystroke dynamics, which only offer an EER of 8.87% at best as compared to the 0% for both feature-level fusion and weighted-score fusion according to the present invention.

Table 5 and Table 6 below show the results of the present invention on the minimum number of enrollment samples using feature-level fusion and weighted score fusion respectively. In general performance drops (i.e., EER increases) as the number of enrollment samples are reduced. Furthermore, as the combination of fields increases, the reduction in the number of enrollment samples has a lesser effect on performance.

TABLE 5

Number of enrollment samples and their corresponding EER values using feature-level fusion

| | Number of enrollment samples | | | | | |
|---|---|---|---|---|---|---|
| Field | 10 | 9 | 8 | 7 | 6 | 5 |
| DUET | | | | | | |
| Email + Fullname | 4.88 | 8.86 | 9.19 | 9.47 | 11.89 | 10.64 |
| TRIO | | | | | | |
| Declare + Email + Address | 3.13 | 3.96 | 5.55 | 7.72 | 6.46 | 7.09 |
| QUARTET | | | | | | |
| Declare + Email + Address + Fullname | 2.36 | 3.17 | 4.74 | 5.37 | 8.39 | 10.44 |
| QUINTET | | | | | | |
| Declare + Email + Address + Fullname + City | 0.00 | 0.00 | 2.00 | 1.85 | 5.38 | 8.31 |
| SEXTET | | | | | | |
| Declare + Email + Address + Fullname + City + Zip | 0.00 | 0.00 | 0.00 | 0.00 | 5.65 | 7.98 |
| SEPTET | | | | | | |
| Declare + Email + Address + Fullname + City + Zip + Phone | 2.18 | 3.58 | 3.22 | 3.36 | 4.04 | 6.91 |

TABLE 6

Number of enrollment samples and their corresponding EER values using weighted-score fusion

| | Number of enrollment samples | | | | | |
|---|---|---|---|---|---|---|
| Field | 10 | 9 | 8 | 7 | 6 | 5 |
| DUET | | | | | | |
| Email + Declare | 4.3 | 4.37 | 4.46 | 5.8 | 5.83 | 6.04 |
| TRIO | | | | | | |
| Email + Declare + Fullname | 2.7 | 3.87 | 3.47 | 4.26 | 5.29 | 5.3 |

TABLE 6-continued

Number of enrollment samples and their corresponding EER values using weighted-score fusion

| Field | Number of enrollment samples | | | | | |
|---|---|---|---|---|---|---|
| | 10 | 9 | 8 | 7 | 6 | 5 |
| QUARTET | | | | | | |
| Email + Declare + Fullname + Address | 2.27 | 3.09 | 2.61 | 3.88 | 4.97 | 4.92 |
| QUINTET | | | | | | |
| Email + Declare + Fullname + Address + Zip | 2.21 | 3.49 | 3.04 | 3.97 | 4.85 | 4.81 |
| SEXTET | | | | | | |
| Email + Declare + Fullname + Address + Zip + City | 1.4 | 0.90 | 1.78 | 3.52 | 3.83 | 4.55 |
| SEPTET | | | | | | |
| Email + Declare + Fullname + Address + Zip + City + Phone | 0.00 | 0.00 | 1.88 | 3.54 | 3.85 | 3.58 |

For example, in Table [8], for the combination of five fields (Quintet), when the enrollment sample is reduced from 10 to 9, the performance stays the same (0%) but degrades when the enrollment sample is further reduced to 8. Meanwhile, for the combination of six fields (Sextet), performance stays the same as 0% when enrollment samples reduce gradually from 10 till 7. A possible explanation is, as fields are combined, the total number of digraphs increases, which counters the negative effect from the reduction in enrollment samples. Hence, short test samples will require more enrollment samples to build a user profile than long text in order to accomplish the same level of accuracy.

Keystroke dynamics may thus be used as an additional security measure to further protect the account recovery mechanism. To that end, the Scaled Manhattan Distance can achieve the best EER of 5.47% when using individual fields, a global best EER of 0% with five fields combined using feature-level fusion and 0% for weighted-score fusion with all seven fields combined. In deciding the number of enrollment samples needed to build a user's profile, we a short test sample would require more enrollment samples than a long test sample. Overall, the present invention outperforms the state-of-the-art in both fixed-text and free-text keystroke dynamics.

In another aspect, the present invention includes a kernel density estimation (KDE) based algorithm. In statistics, KDE is a non-parametric way to estimate the probability density function (PDF) of a random variable. Kernel density estimation is a fundamental data smoothing problem where inferences about the population are made based on a finite data sample. The present invention used KDE to estimate the probability density of a digraph in the profile and in a test sample. The estimated PDFs are used to calculate the distance between reference profile samples and test samples. Specifically, in the present implementation, a function in Python that is called statsmodels.api.nonparametric.KDEUnivariate is used to estimate PDFs.

Under ideal circumstances (the distribution is known and density is well behaved), a sample size of at least 4 data points is required in order to run KDE for one dimensional data. When KDE is used to estimate the PDFs for only digraphs that have 4 or more instances in both the profile and test samples, the best performance results are obtained. When KDE is also applied to digraphs that have fewer than 4 instances, the performance results become worse. On the other hand, only those digraphs that have enough instances are used as features, fewer digraphs qualify. As a result, fewer features are used in authentication, resulting in worse performance. By using KDE for those digraphs that have enough instances, but using average density for those that do not, the best performance is achieved. Fusing these two are explained below.

For each digraph that has four or more instances in both the profile and the test samples, two PDFs are estimated using KDE. Note that the PDFs are functions of digraph flight time. For each value between 0 to 500 ms, the absolute difference of the two PDFs is calculated. All the differences for the digraph are summed. Finally, an average PDF difference is calculated, D, for all such digraphs (those with four or more instances). For each digraph that has four or more instances in the profile sample, but not so in the test sample, the PDF estimated for the profile sample is used to calculate the average probability density for all the instances in the test sample. Finally, an average probability density, d, is calculated for all such digraphs (those with fewer than four instances). The final distance score between two samples is a weighted sum of the average PDF difference, D, and the average probability density, d, namely, D−20*d, where the weight coefficient 20 is determined by trial and error. Finally, in the extremely unlikely case where none of the digraphs shared by the profile sample and the test sample contains enough instances, the test sample will be rejected.

The authentication performance for keystroke dynamics was evaluated using three standard metrics: (i) FAR (False Accept Rate): The ratio of impostor attacks that are falsely accepted as genuine users; (ii) FRR (False Reject Rate): The ratio of genuine tests that are falsely rejected as impostors; and (iii) EER (Equal Error Rate): The point on a DET curve where FAR and FRR are equal. The KDE based algorithm was evaluated using four datasets and tested out using the same profile size of 10,000 keystrokes and a test sample size of 1,000 keystrokes.

Figure 20:
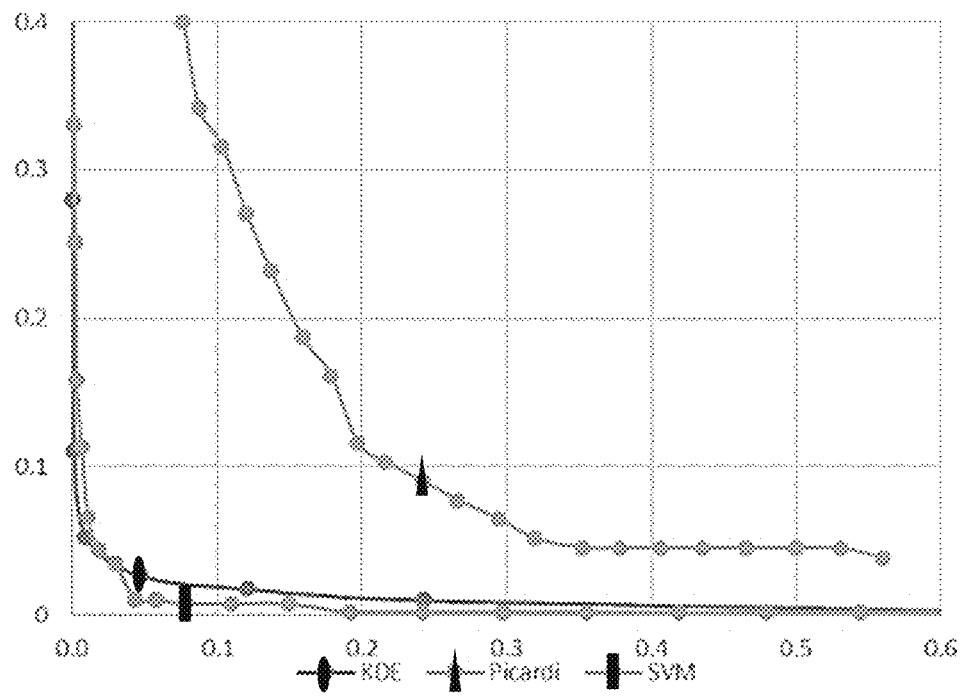
FIG. 20 is a graph of DET curves for Torino dataset (X-axis: False Accept Rate, Y-axis: False Reject Rate). EER for the three algorithms, KDE, Gunetti & Picardi, and SVM, are 0.0348, 0.0311, and 0.1688, respectively.
Figure 21:
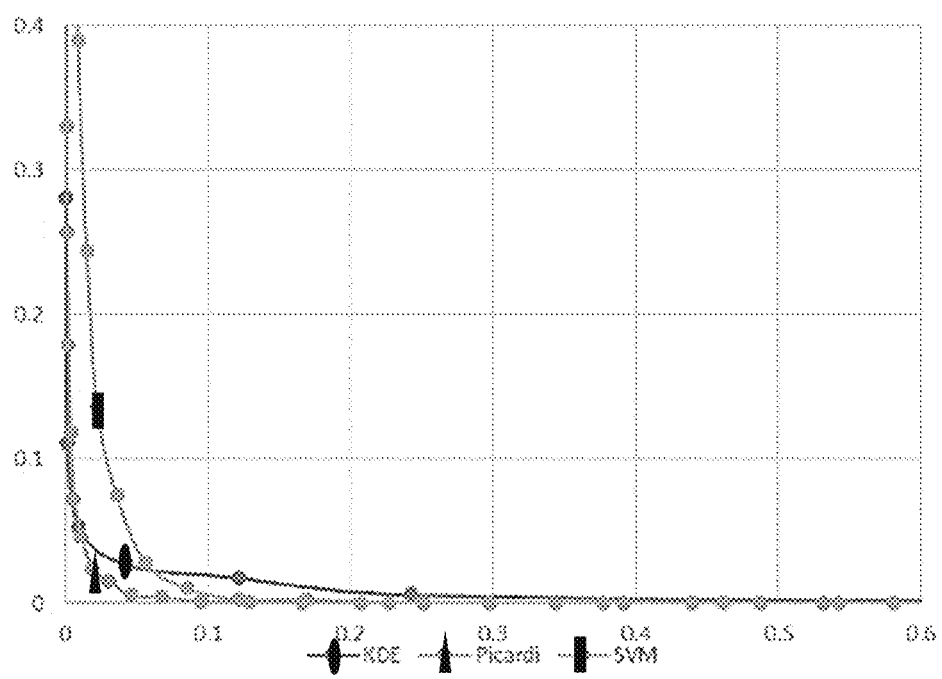
FIG. 21 is a graph of DET curves for Clarkson Dataset I. EER for KDE, Gunetti & Picardi, and SVM are 0.0336, 0.0217, and 0.0377, respectively.
Figure 22:
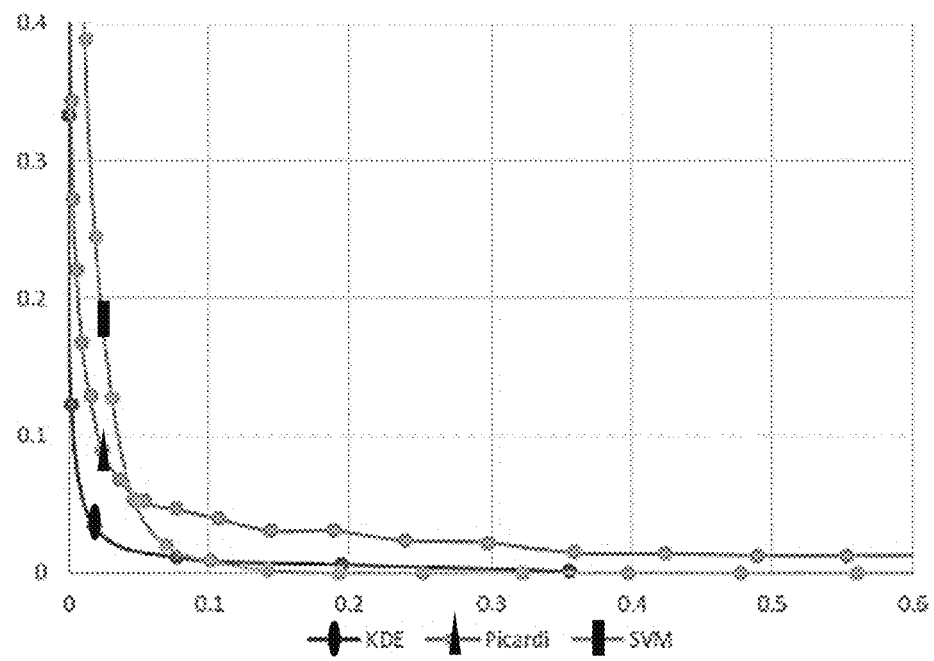
FIG. 22 is a graph of DET curves for Buffalo dataset. EER for KDE, Gunetti & Picardi, and SVM are 0.0195, 0.0375, and 0.0493, respectively.
Figure 23:
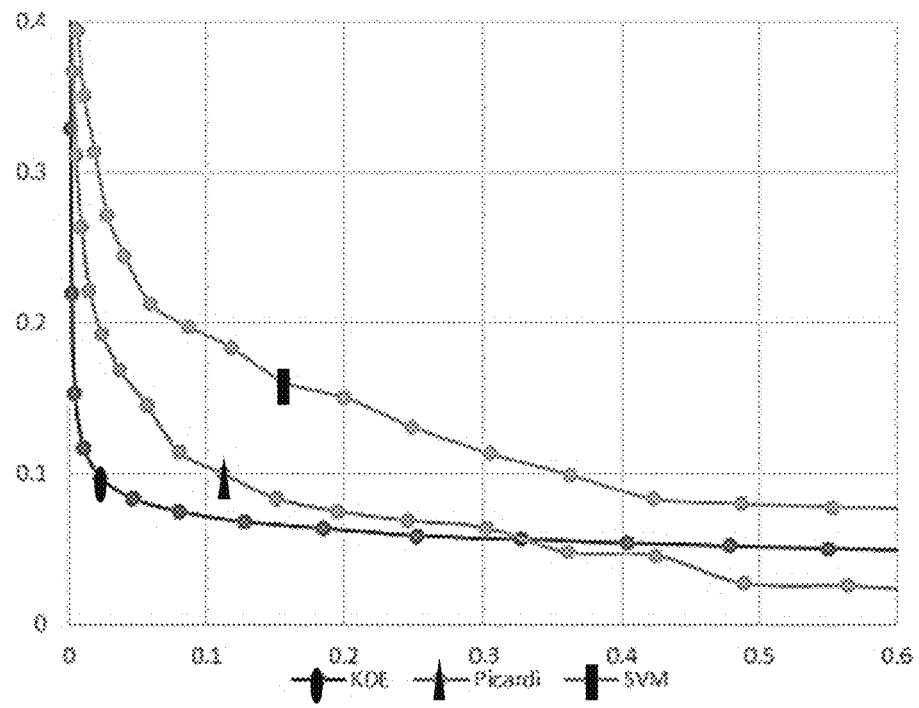
FIG. 23 is a graph of DET curves for our unconstrained dataset (Clarkson II). EER for KDE, Gunetti & Picardi, and SVM are 0.0759, 0.1036, and 0.1567, respectively.
Figure 24:
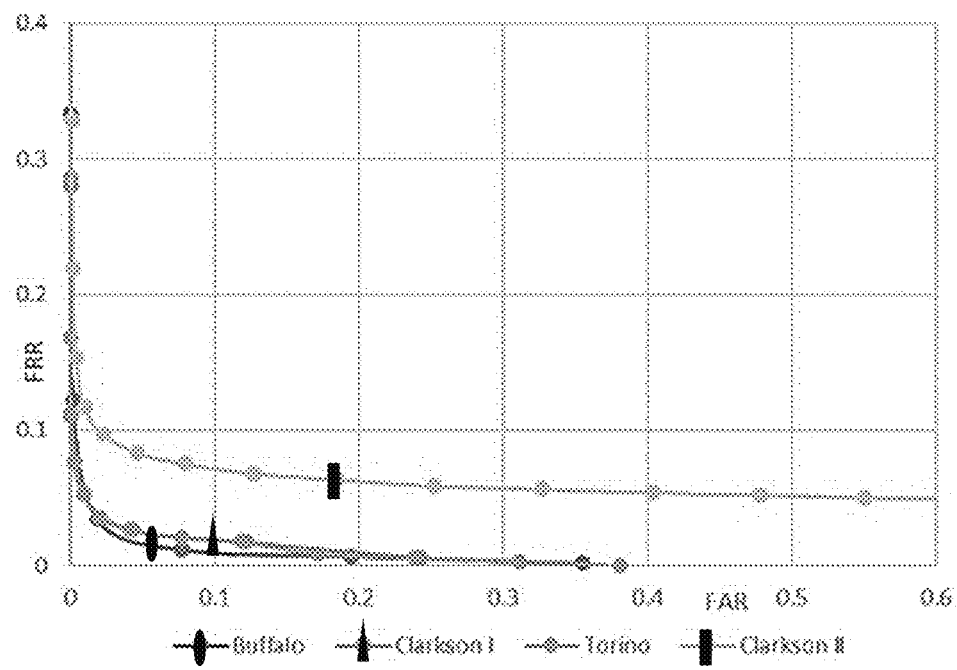
FIG. 24 is a graph of DET curves for the KDE algorithm.
Figure 25:
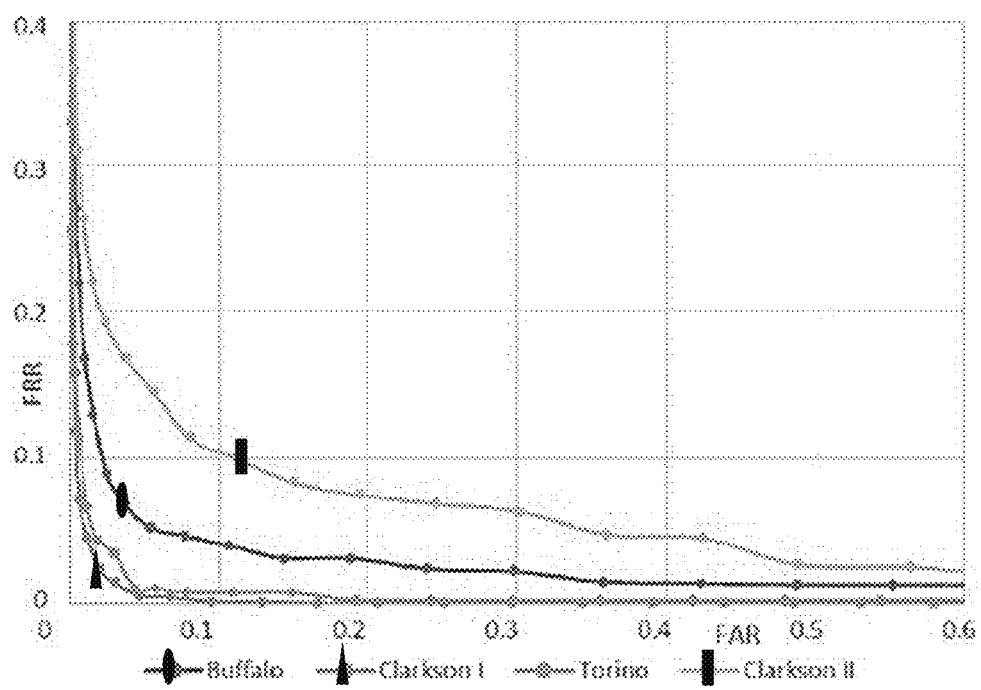
FIG. 25 is a graph of DET curves for the Gunetti & Picardi algorithm.

FIGS. 20, 21, 22, and 23 depict the Detection Error Tradeoff (DET) curves of running the three algorithms on the four datasets, Torino, Clarkson I, Buffalo, and our own new, unconstrained dataset (Clarkson II), respectively. As shown in FIG. 23, using the Torino dataset, our KDE algorithm performs slightly better than the conventional Gunetti & Picardi approach. Both are much better than the SVM approach. FIG. 24 shows the DET curves of running the three algorithms on the Clarkson I dataset. All three algorithms perform better on this dataset than Torino. Moreover, Gunetti & Picardi does better than the other two. FIG. 25 shows the DET curves for the Buffalo dataset. On this dataset, out of the three, the KDE algorithm achieves the best performance (EER of 0.0195), and the SVM algorithm performs the worst (EER of 0.0493). FIG. 4 shows the DET curves for our new, unconstrained dataset (Clarkson II), where KDE performs the best and SVM the worst. Note that all three algorithms perform the worst on our new dataset than on the other three datasets as shown in FIGS. 20, 21, and 22. Moreover, the performance difference between the three algorithms on our new dataset is also quite large. We believe that this performance degradation and variation are due to the fact that our new dataset is unconstrained and thus contains much more 'noisy' keystrokes than the other three.

Figure 26:
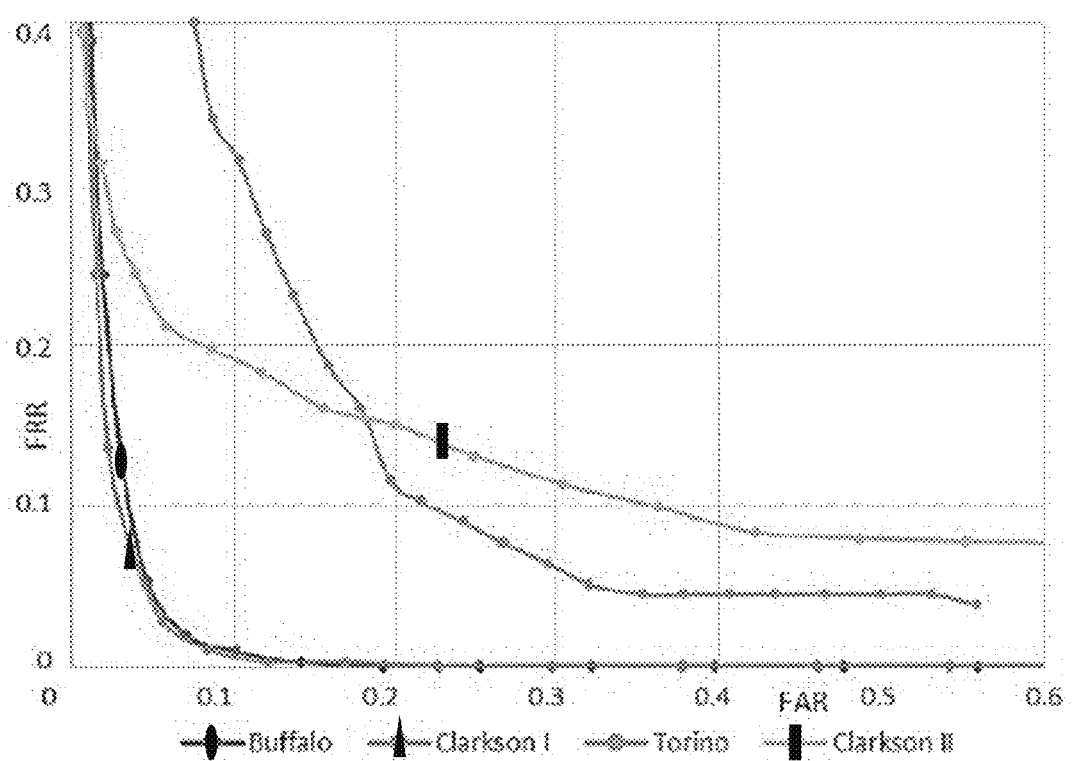
FIG. 26 is a graph of DET curves for the SVM algorithm.

To facilitate comparison, FIGS. 24, 25, and 26 depict the DET curves of running the three algorithms on the four datasets, and Table 7 depicts the EERs. FIG. 5 shows the DET curves for running the KDE algorithm on the four datasets. As shown, the KDE algorithm has similar performance on the first three datasets, which are much cleaner than Clarkson II due to the ways they are collected. It is noteworthy that the KDE algorithm still performs reasonably well on Clarkson II, despite the fact that it is unconstrained and contains much more 'noisy' data.

TABLE 7

EERs for the three algorithms on the four datasets

| Dataset | KDE | Gunetti & Picardi | SVM |
| --- | --- | --- | --- |
| Torino | 0.0348 | 0.0311 | 0.1688 |
| Clarkson I | 0.0336 | 0.0217 | 0.0377 |
| Buffalo | 0.0195 | 0.0375 | 0.0493 |
| Clarkson II | 0.0759 | 0.1036 | 0.1567 |

FIG. 25 shows DET curves for the Gunetti & Picardi algorithm. This algorithm achieves similar performance on the Torino dataset and Clarkson I, but degrades significantly on the Buffalo dataset, and even worse on our Clarkson II. FIG. 26 shows DET curves for the SVM algorithm. This algorithm performs similarly on Clarkson I and the Buffalo dataset, but significantly worse on Torino and Clarkson II.

As shown in Table 7 above, both the KDE and Gunetti & Picardi's algorithms perform better than the SVM algorithm consistently across the four datasets. The main reason for this difference is that the former two use many more features, often hundreds of n-graphs, than the two dozens or so features used in the SVM algorithm. As a result, the dwell time is especially important for the SVM algorithm. When dwell times are missing in the Torino dataset, its performance degrades significantly (FIG. 26).

As shown in Table III, the four datasets disagree on whether the KDE algorithm is better than Gunetti & Picardi's algorithm. However, it is clear that all of the algorithms do not perform as well on unconstrained datasets as laboratory datasets. The KDE algorithm responds to unconstrained, 'noisy' data in the most robust way, and performs the best.

The KDE-based algorithm of the present invention has the best EER on the Buffalo dataset and our new, unconstrained dataset (Clarkson II), whereas Gunetti & Picardi's algorithm has better EER on the other two datasets. Buffalo's SVM has the worst performance on all four datasets. The KDE algorithm shows similar performance on the Buffalo, Clarkson, and Torino datasets. Overall, the KDE creates the most consistent, stable performance. Not only does it has the most similar performance on other datasets, its performance on our unconstrained dataset (Clarkson II) degrades the least. The Gunetti & Picardi algorithm performs worse on the Buffalo dataset, but similar on the other two. The SVM algorithm has a similar performance on the Buffalo dataset and Clarkson I, but much worse on Torino because it does not have the key release time the algorithm requires.

It may be concluded that because all three datasets are collected in similar settings, they have similar performance. The differences between English and Italian seem to have played little, if any, role. On the other hand, the new, unconstrained dataset (Clarkson II) is composed of typing during a participant's normal computing behavior and includes keystrokes from a variety of activities, as well as noisy keystrokes from activities such as gaming. It creates the worst performance for all three algorithms, but it is more likely to reflect the reality of real-world keystroke dynamics.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A computer implemented method for authenticate users on a computing system using a free text behavioral biometric method on a computer having non-transitory memory and a processor, comprising executing on the processor the steps of:
   a. recording on the computer system a dataset for each user to be authenticated to create a user profile for each user to be authenticated, each data set comprising a plurality of free-text keystrokes entered by a respective user on a computer that is part of the computing system, and storing each user profile in the memory;
   b. subsequently collecting the keystrokes of a user to be authenticated as the user enters text on a keyboard connected to the computing system;
   c. creating a plurality of graphs based on the collection of keystrokes entered by the user in step (b), each of which represents a cumulative density function of the user for each feature shared between the user profile and the user to be authenticated entered in step (b);
   d. using the computer, calculating an instance based tail area density (ITAD) metric by:

$$s_i \begin{cases} CDF_{g_i}(x_i) & \text{if } x_i \leq M_{g_i} \\ 1 - CDF_{g_i}(x_i) & \text{if } x_i > M_{g_i} \end{cases},$$

wherein N is the number of graphs shared between the user profile and collection of keystrokes entered by the user in step (b), $CDF_{g_i}(*)$ is the empirical cumulative distribution function of the $i^{th}$ graph $g_i$ in the user profile, $M_g$ is the median of the $i^{th}$ graph in the user profile, $X_i$ is the individual test graph duration for the ith shared graph in the collection of keystrokes entered by the user in step (b);

e. using the computer, combining the ITAD metric for each graph duration into a single similarity score using the following equation:

$$S = \frac{1}{N}\sum_{i=1}^{N} s_i^p,$$

wherein the parameter p serves as a scaling factor and can be selectively tuned depending on the application, and if 0<p<1, then lower scores are scaled up more than higher scores, and if p>1 then larger scores will be shifted down by a lesser amount than lower scores; and f. determining, by the computer, whether the user entering the keystrokes in step (b) matches an authenticated user from step (a) based on the single similarity score above a predetermined threshold value.

2. The computer implemented method to authenticate users on a computing system according to claim 1, wherein the shared features from step (c) can be any of a monograph and any one of a digraph DD, UD, UU, or DU.

3. A non-transitory computer-readable medium for authenticating users on a computing system using a free text behavioral biometric method, comprising instructions stored thereon, that when executed on a processor, perform the steps of:

a. recording on the computer system a dataset for each user to be authenticated to create a user profile for each user to be authenticated, each data set comprising a plurality of free-text keystrokes entered by a respective user on a computer via a computer input device that is part of the computing system, and storing each user profile in the memory;

b. subsequently collecting the keystrokes of a user to be authenticated as the user enters text on a computer input device connected to the computing system;

c. creating a plurality of graphs based on the collection of keystrokes entered by the user in step (b), each of which represents a cumulative density function of the user for each feature shared between the user profile and the user to be authenticated entered in step (b);

d. using the computer, calculating an instance based tail area density (ITAD) metric by:

$$s_i \begin{cases} CDF_{g_i}(x_i) & \text{if } x_i \leq M_{g_i} \\ 1 - CDF_{g_i}(x_i) & \text{if } x_i > M_{g_i} \end{cases},$$

wherein N is the number of graphs shared between the user profile and collection of keystrokes entered by the user in step (b), $CDF_{g_i}(*)$ is the empirical cumulative distribution function of the $i^{th}$ graph $g_i$ in the user profile, $M_g$ is the median of the $i^{th}$ graph in the user profile, $X_i$ is the individual test graph duration for the ith shared graph in the collection of keystrokes entered by the user in step (b);

e. using the computer, combining the ITAD metric for each graph duration into a single similarity score using the following equation:

$$S = \frac{1}{N}\sum_{i=1}^{N} s_i^p,$$

wherein the parameter p serves as a scaling factor and can be selectively tuned depending on the application, and if 0<p<1, then lower scores are scaled up more than higher scores, and if p>1 then larger scores will be shifted down by a lesser amount than lower scores;

f. determining, by the computer, whether the user entering the keystrokes in step (c) matches an authenticated user from step (a) based on the single similarity score above a predetermined threshold value.

4. The non-transitory computer-readable medium according to claim 3, wherein the shared features from step (c) can be any of a monograph and any one of a digraph DD, UD, UU, or DU.

5. An account recovery system, comprising:

an account recovery form having a plurality of text entry fields that can accept the entry of text;

a processor programmed to determine a scaled Manhattan distance metric for each of the plurality of text entry fields based on a set of keystroke dynamic features associated with text entered into each of the plurality of data fields of the account recovery form;

a database containing a user profile containing the scaled Manhattan distant metric for each of the plurality of text entry fields in connection with text previously entered into each of the plurality of data fields of the account recovery form;

wherein the processor is further programmed to determine whether the scaled Manhattan distance metric of any new text entered into each of the plurality of text entry fields of the account recovery form matches the scaled Manhattan distant metric for text previously entered into each of the plurality of data fields of the account recovery form;

wherein the processor is programmed to calculate an instance based tail area density (ITAD) metric by:

$$s_i = \begin{cases} CDF_{g_i}(x_i) & \text{if } x_i \leq M_{g_i} \\ 1 - CDF_{g_i}(x_i) & \text{if } x_i > M_{g_i} \end{cases},$$

wherein N is the number of graphs shared between the user profile and collection of keystrokes entered by the user, $CDF_{g_i}(*)$ is the empirical cumulative distribution function of the $i^{th}$ graph $g_i$ in the user profile, $M_g$ is the median of the $i^{th}$ graph in the user profile, $X_i$ is the individual test graph duration for the ith shared graph in the collection of keystrokes entered by the user; and wherein the processor is programmed to combine the ITAD metric for each graph duration into a single similarity score using the following equation:

$$S = \frac{1}{N}\sum_{i=1}^{N} s_i^p,$$

wherein the parameter p serves as a scaling factor and can be selectively tuned depending on the application, and if 0<p<1, then lower scores are scaled up more than higher scores, and if p>1 then larger scores will be shifted down by a lesser amount than lower scores.

6. The account recovery system of claim 5, wherein the processor is programmed to determine whether the scaled Manhattan distance metric of any new text entered into each of the plurality of text entry fields of the account recovery form matches the scaled Manhattan distant metric for text previously entered into each of the plurality of data fields of the account recovery form by fusing the scaled Manhattan distant metric of a subset of the plurality of data fields.

7. The account recovery system of claim 6, wherein the fusing of the scaled Manhattan distant metric is performed by merging the set of keystroke dynamic features of multiple of the plurality of text entry fields.

8. The account recovery system of claim 7, wherein the fusing of the scaled Manhattan distant metric is performed by weighting the scaled Manhattan distant metric of each of the plurality of text entry fields.

9. The account recovery system of claim 8, wherein the subset comprises five fields.

\* \* \* \* \*